(12) United States Patent
Rofougaran et al.

(10) Patent No.: US 7,664,461 B2
(45) Date of Patent: Feb. 16, 2010

(54) RFID READER ARCHITECTURE

(75) Inventors: Ahmadreza (Reza) Rofougaran, Newport Coast, CA (US); Kambiz Shoarinejad, Los Angeles, CA (US)

(73) Assignee: Broadcom Corporation, Irvine, CA (US)

( * ) Notice: Subject to any disclaimer, the term of this patent is extended or adjusted under 35 U.S.C. 154(b) by 681 days.

(21) Appl. No.: 11/377,812

(22) Filed: Mar. 16, 2006

(65) Prior Publication Data

US 2007/0207732 A1 Sep. 6, 2007

Related U.S. Application Data

(60) Provisional application No. 60/778,520, filed on Mar. 2, 2006.

(51) Int. Cl.
*H04B 5/00* (2006.01)

(52) U.S. Cl. .................. 455/41.1; 455/41.2; 455/552.1; 455/553.1; 340/10.1; 340/10.2; 375/295; 375/316

(58) Field of Classification Search ............... 455/11.1, 455/41.1, 41.2, 41.3, 73, 127.4, 552.1, 553.1; 340/10.1, 10.2, 10.3, 572.1; 375/295, 316
See application file for complete search history.

(56) References Cited

U.S. PATENT DOCUMENTS

| | | | |
|---|---|---|---|
| 6,046,683 A | 4/2000 | Pidwerbetsky et al. | |
| 6,150,948 A | 11/2000 | Watkins | |
| 6,192,222 B1 | 2/2001 | Greeff et al. | |
| 6,362,738 B1 | 3/2002 | Vega | |
| 6,639,509 B1 * | 10/2003 | Martinez | 340/10.4 |
| 6,650,227 B1 | 11/2003 | Bradin | |
| 6,717,516 B2 * | 4/2004 | Bridgelall | 340/572.1 |
| 6,903,656 B1 | 6/2005 | Lee | |
| 6,975,228 B2 | 12/2005 | Wrasman et al. | |
| 7,157,985 B2 * | 1/2007 | Mitani et al. | 332/119 |
| 7,280,810 B2 * | 10/2007 | Feher | 455/137 |
| 2002/0160711 A1 * | 10/2002 | Carlson et al. | 455/41 |
| 2004/0069852 A1 * | 4/2004 | Seppinen et al. | 235/451 |
| 2004/0106381 A1 | 6/2004 | Tiller | |

(Continued)

FOREIGN PATENT DOCUMENTS

WO  WO 9311504 A  6/1993

OTHER PUBLICATIONS

EP Search Report dated Sep. 19, 2008.

*Primary Examiner*—Nay A Maung
*Assistant Examiner*—Tuan H Nguyen
(74) *Attorney, Agent, or Firm*—Garlick Harrison & Markison; Holly L. Rudnick

(57) ABSTRACT

A highly integrated and low-cost reader for a radio frequency identification (RFID) system is realized by providing a transmitter operable to generate an outbound radio frequency (RF) signal and a receiver operable to receive an inbound RF signal having a frequency similar to a frequency of the outbound RF signal on a single integrated circuit. Since the inbound RF signal may include not only a modulated RF signal produced by an RFID tag responsive to the outbound RF signal, but also a blocking signal corresponding to the outbound RF signal, the receiver additionally includes a block cancellation module operable to substantially cancel the blocking signal from the inbound RF signal using the outbound RF signal and to substantially pass the modulated RF signal before downconversion of the modulated RF signal.

20 Claims, 16 Drawing Sheets

U.S. PATENT DOCUMENTS

2006/0006986 A1    1/2006  Gravelle et al.
2006/0183454 A1*   8/2006  Al-Mahdawi ............... 455/296
2007/0205897 A1*   9/2007  Forster ................... 340/572.3

* cited by examiner

RFID READER ARCHITECTURE

CROSS REFERENCE TO RELATED PATENTS

This U.S. application for patent claims the benefit of the filing date of U.S. Provisional Patent Application entitled, RFID READER ARCHITECTURE, having Ser. No. 60/778, 520, filed on Mar. 2, 2006, which is incorporated herein by reference for all purposes.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

1. Technical Field of the Invention

This invention is related generally to radio-frequency identification (RFID) systems, and more particularly to RFID readers.

2. Description of Related Art

A radio frequency identification (RFID) system generally includes a reader, also known as an interrogator, and a remote tag, also known as a transponder. Each tag stores identification data for use in identifying a person, article, parcel or other object. RFID systems may use active tags that include an internal power source, such as a battery, and/or passive tags that do not contain an internal power source, but instead are remotely powered by the reader.

Communication between the reader and the remote tag is enabled by radio frequency (RF) signals. In general, to access the identification data stored on an RFID tag, the RFID reader generates a modulated RF interrogation signal designed to evoke a modulated RF response from a tag. The RF response from the tag includes the coded identification data stored in the RFID tag. The RFID reader decodes the coded identification data to identify the person, article, parcel or other object associated with the RFID tag. For passive tags, the RFID reader also generates an unmodulated, continuous wave (CW) signal to activate and power the tag during data transfer.

RFID systems typically employ either far-field technology, in which the distance between the reader and the tag is great compared to the wavelength of the carrier signal, or near-field technology, in which the operating distance is less than one wavelength of the carrier signal, to facilitate communication between the RFID reader and RFID tag. In far-field applications, the RFID reader generates and transmits an RF signal via an antenna to all tags within range of the antenna. One or more of the tags that receive the RF signal responds to the reader using a backscattering technique in which the tags modulate and reflect the received RF signal. In near-field applications, the RFID reader and tag communicate via mutual inductance between corresponding reader and tag inductors.

Currently, RFID readers are formed of separate and discrete components whose interfaces are well-defined. For example, an RFID reader may consist of a controller or microprocessor implemented on a CMOS integrated circuit and a radio implemented on one or more separate CMOS, BiCMOS or GaAs integrated circuits that are uniquely designed for optimal signal processing in a particular technology (e.g., near-field or far-field). However, the high cost of such discrete-component RFID readers has been a deterrent to widespread deployment of RFID systems. In addition, there are a number of different RFID standards, each defining a different protocol for enabling communication between the reader and the tag. Discrete RFID reader designs inhibit multi-standard capabilities in the reader.

Therefore, a need exists for a highly integrated, low-cost RFID reader. In addition, a need exists for a multi-standard RFID reader.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE SEVERAL VIEWS OF THE DRAWING(S)

DETAILED DESCRIPTION OF THE INVENTION

Figure 1:
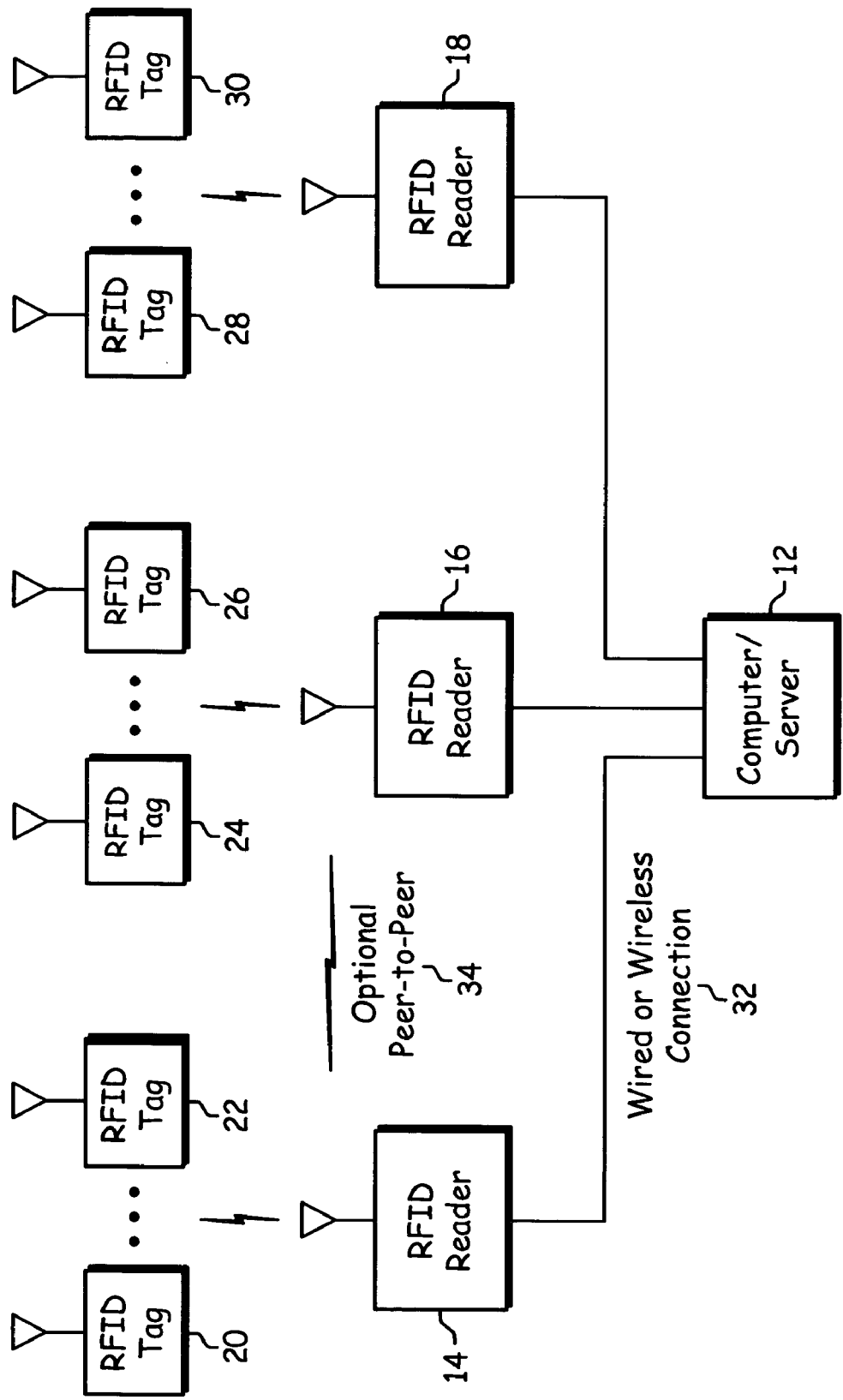
FIG. 1 is a schematic block diagram of an RFID system in accordance with the present invention.

FIG. 1 is a schematic block diagram of an RFID (radio frequency identification) system that includes a computer/server 12, a plurality of RFID readers 14-18 and a plurality of RFID tags 20-30. The RFID tags 20-30 may each be associated with a particular object for a variety of purposes including, but not limited to, tracking inventory, tracking status, location determination, assembly progress, et cetera. The RFID tags may be active devices that include internal power sources or passive devices that derive power from the RFID readers 14-18.

Each RFID reader 14-18 wirelessly communicates with one or more RFID tags 20-30 within its coverage area. For example, RFID tags 20 and 22 may be within the coverage area of RFID reader 14, RFID tags 24 and 26 may be within the coverage area of RFID reader 16, and RFID tags 28 and 30 may be within the coverage area of RFID reader 18. In one embodiment, the RF communication scheme between the RFID readers 14-18 and RFID tags 20-30 is a backscatter technique whereby the RFID readers 14-18 request data from the RFID tags 20-30 via an RF signal, and the RF tags 20-30 respond with the requested data by modulating and backscattering the RF signal provided by the RFID readers 14-18. In another embodiment, the RF communication scheme between the RFID readers 14-18 and RFID tags 20-30 is an inductance technique whereby the RFID readers 14-18 magnetically couple to the RFID tags 20-30 via an RF signal to access the data on the RFID tags 20-30. In either embodiment, the RFID tags 20-30 provide the requested data to the RFID readers 14-18 on the same RF carrier frequency as the RF signal.

In this manner, the RFID readers 14-18 collect data as may be requested from the computer/server 12 from each of the RFID tags 20-30 within its coverage area. The collected data is then conveyed to computer/server 12 via the wired or wireless connection 32 and/or via peer-to-peer communication 34. In addition, and/or in the alternative, the computer/server 12 may provide data to one or more of the RFID tags 20-30 via the associated RFID reader 14-18. Such downloaded information is application dependent and may vary greatly. Upon receiving the downloaded data, the RFID tag can store the data in a non-volatile memory therein.

As indicated above, the RFID readers 14-18 may optionally communicate on a peer-to-peer basis such that each RFID reader does not need a separate wired or wireless connection 32 to the computer/server 12. For example, RFID reader 14 and RFID reader 16 may communicate on a peer-to-peer basis utilizing a back scatter technique, a wireless LAN technique, and/or any other wireless communication technique. In this instance, RFID reader 16 may not include a wired or wireless connection 32 to computer/server 12. In embodiments in which communications between RFID reader 16 and computer/server 12 are conveyed through the wired or wireless connection 32, the wired or wireless connection 32 may utilize any one of a plurality of wired standards (e.g., Ethernet, fire wire, et cetera) and/or wireless communication standards (e.g., IEEE 802.11x, Bluetooth, et cetera).

As one of ordinary skill in the art will appreciate, the RFID system of FIG. 1 may be expanded to include a multitude of RFID readers 14-18 distributed throughout a desired location (for example, a building, office site, et cetera) where the RFID tags may be associated with equipment, inventory, personnel, et cetera. In addition, it should be noted that the computer/server 12 may be coupled to another server and/or network connection to provide wide area network coverage.

Figure 2A:
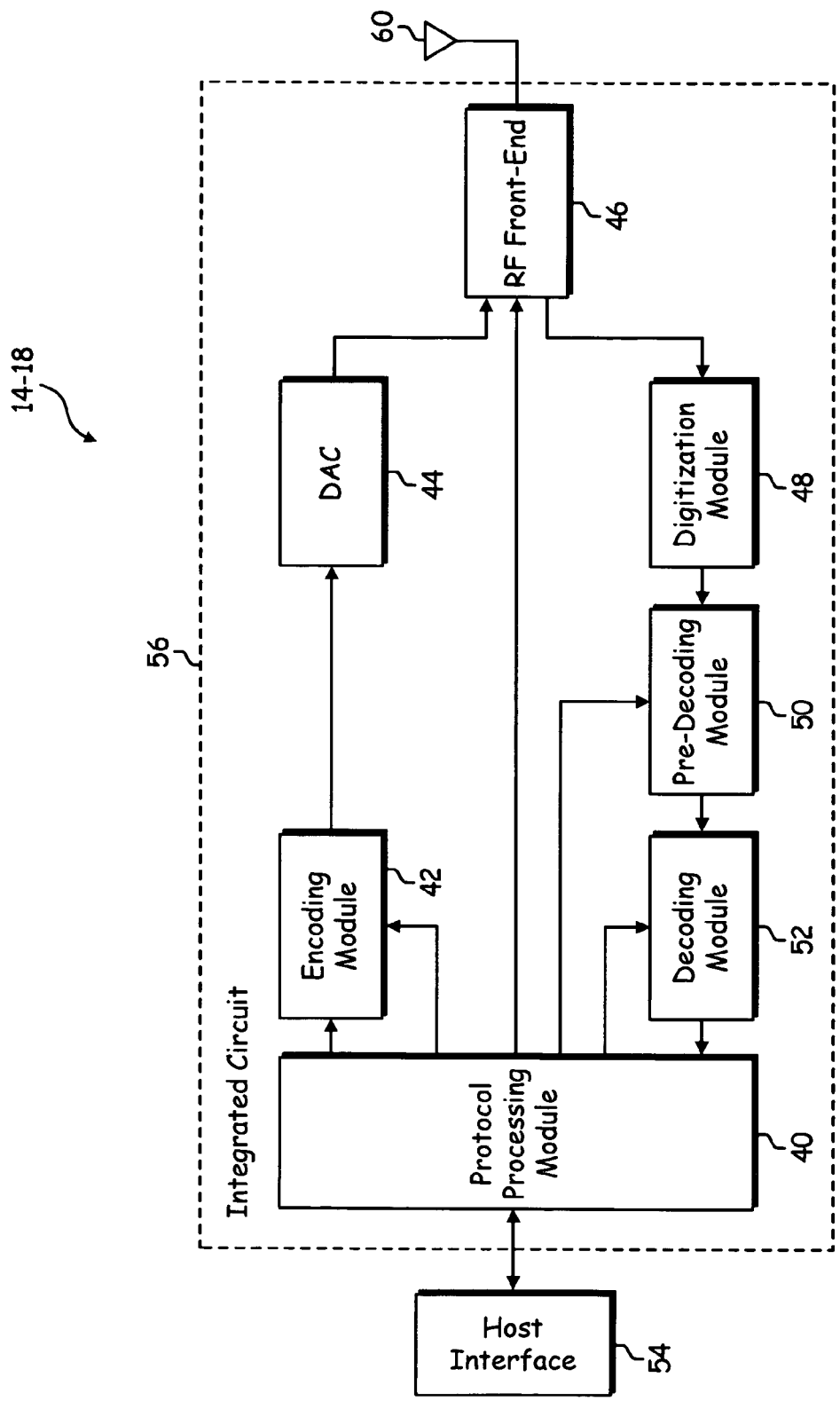
FIGS. 2A and 2B are schematic block diagrams of an RFID reader in accordance with the present invention.
Figure 2B:
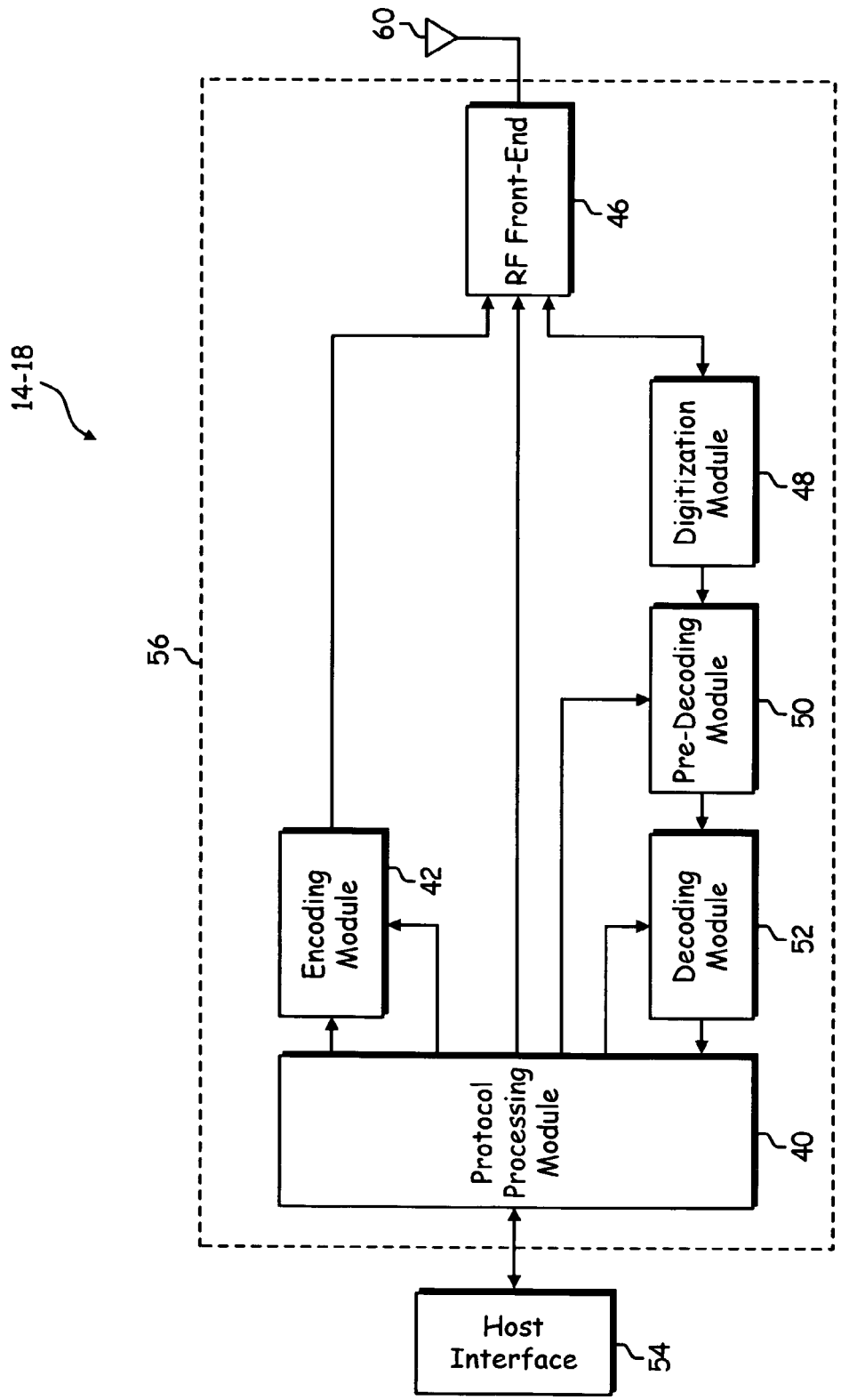

FIGS. 2A and 2B are schematic block diagrams of an RFID reader 14-18 that includes an integrated circuit 56 and may further include a host interface module 54. By integrating the RFID reader 14-18 onto a single integrated circuit 56, the cost of the RFID reader 14-18 is significantly reduced. As shown in FIGS. 2A and 2B, the integrated circuit 56 includes a protocol processing module 40, an encoding module 42, an RF front-end 46, a digitization module 48, a predecoding module 50 and a decoding module 52, all of which together form the essential components of the RFID reader 14-18. In FIG. 2A, the integrated circuit 56 further includes a digital-to-analog converter (DAC) 44, whereas in FIG. 2B, the DAC 44 is removed from the transmit path. Thus, in FIG. 2B, the power amplifier in the RF front end 46 takes digital power control input. The host interface module 54 may include a communication interface to a host device, such as a USB dongle, compact flash or PCMCIA.

The protocol processing module 40 is operably coupled to prepare data for encoding in accordance with a particular RFID standardized protocol. In an exemplary embodiment, the protocol processing module 40 is programmed with multiple RFID standardized protocols to enable the RFID reader 14-18 to communicate with any RFID tag, regardless of the particular protocol associated with the tag. In this embodiment, the protocol processing module 40 operates to program filters and other components of the encoding module 42, decoding module 52, pre-decoding module 50 and RF front end 46 in accordance with the particular RFID standardized protocol of the tag(s) currently communicating with the RFID reader 14-18.

In operation, once the particular RFID standardized protocol has been selected for communication with one or more RFID tags, the protocol processing module 40 generates and provides digital data to be communicated to the RFID tag to the encoding module 42 for encoding in accordance with the selected RFID standardized protocol. By way of example, but not limitation, the RFID protocols may include one or more line encoding schemes, such as Manchester encoding, FM0 encoding, FM1 encoding, etc. Thereafter, in embodiments in which the integrated circuit 56 includes DAC 44, as shown in FIG. 2A, the digitally encoded data is provided to the digital-to-analog converter 44 which converts the digitally encoded data into an analog signal. The RF front-end 46 modulates the analog signal to produce an RF signal at a particular carrier frequency that is transmitted via antenna 60 to one or more RFID tags.

The RF front-end 46 further includes transmit blocking capabilities such that the energy of the transmitted RF signal does not substantially interfere with the receiving of a backscattered or other RF signal received from one or more RFID tags via the antenna 60. Upon receiving an RF signal from one or more RFID tags, the RF front-end 46 converts the received RF signal into a baseband signal. The digitization module 48, which may be a limiting module or an analog-to-digital converter, converts the received baseband signal into a digital signal. The predecoding module 50 converts the digital signal into an encoded signal in accordance with the particular RFID protocol being utilized. The encoded data is provided to the decoding module 52, which recaptures data therefrom in accordance with the particular encoding scheme of the selected RFID protocol. The protocol processing module 40 processes the recovered data to identify the object(s) associated with the RFID tag(s) and/or provides the recovered data to the server and/or computer for further processing.

The processing module 40 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module may have an associated memory element, which may be a single memory device, a plurality of memory devices, and/or embedded circuitry of the processing module. Such a memory device may be a read-only memory, random access memory, volatile memory, non-volatile memory, static memory, dynamic memory, flash memory, cache memory, and/or any device that stores digital information. Note that when the processing module 40 implements one or more of its functions via a state machine, analog circuitry, digital circuitry, and/or logic circuitry, the memory element storing the corresponding operational instructions may be embedded within, or external to, the circuitry comprising the state machine, analog circuitry, digital circuitry, and/or logic circuitry. Further note that, the memory element stores, and the processing module 40 executes, hard coded and/or operational instructions corresponding to at least some of the steps and/or functions illustrated in FIGS. 3-10 below.

Figure 3A:
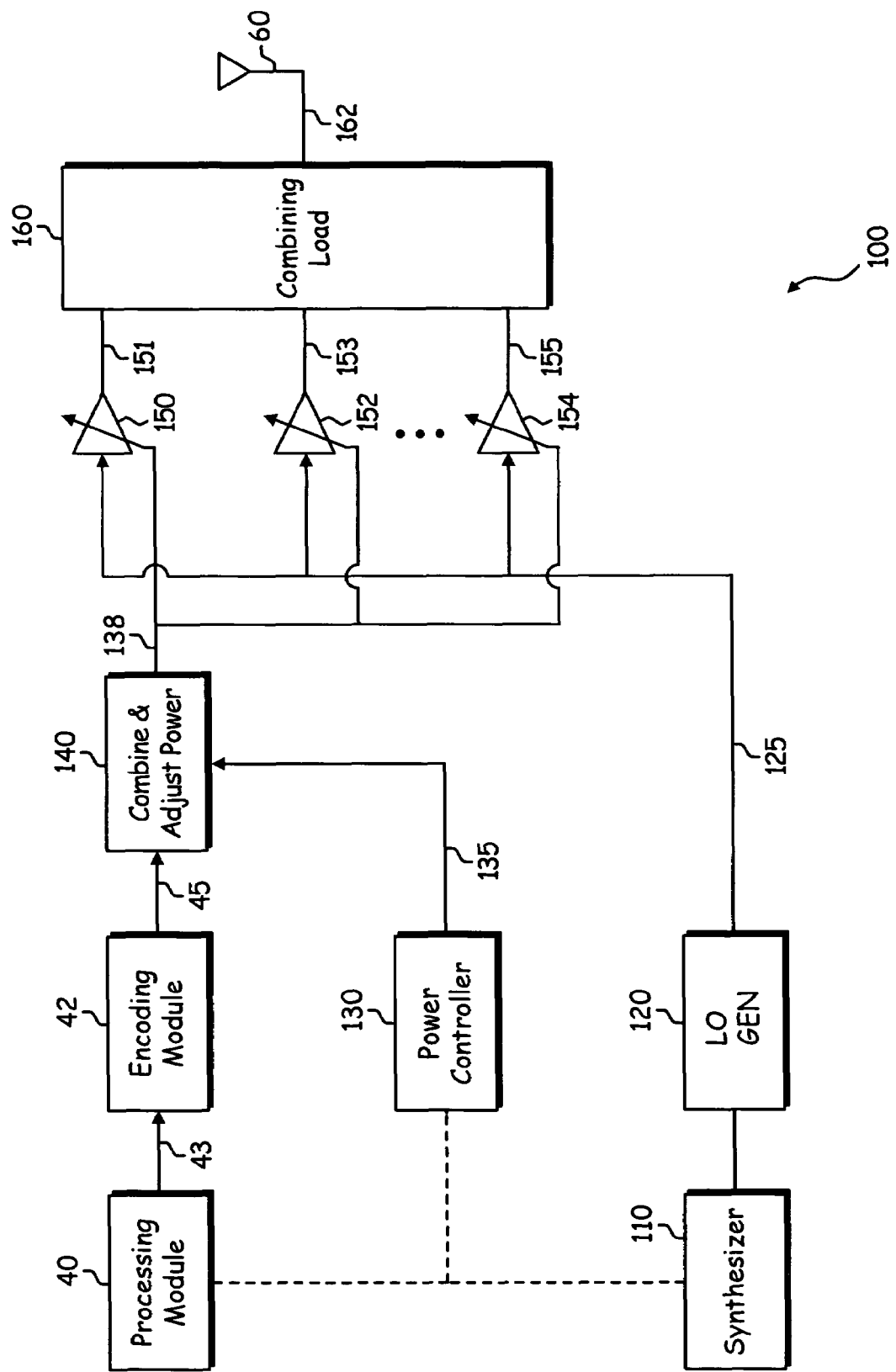
FIGS. 3A-3D are schematic block diagrams of a transmitter of the RFID reader in accordance with the present invention.
Figure 3B:
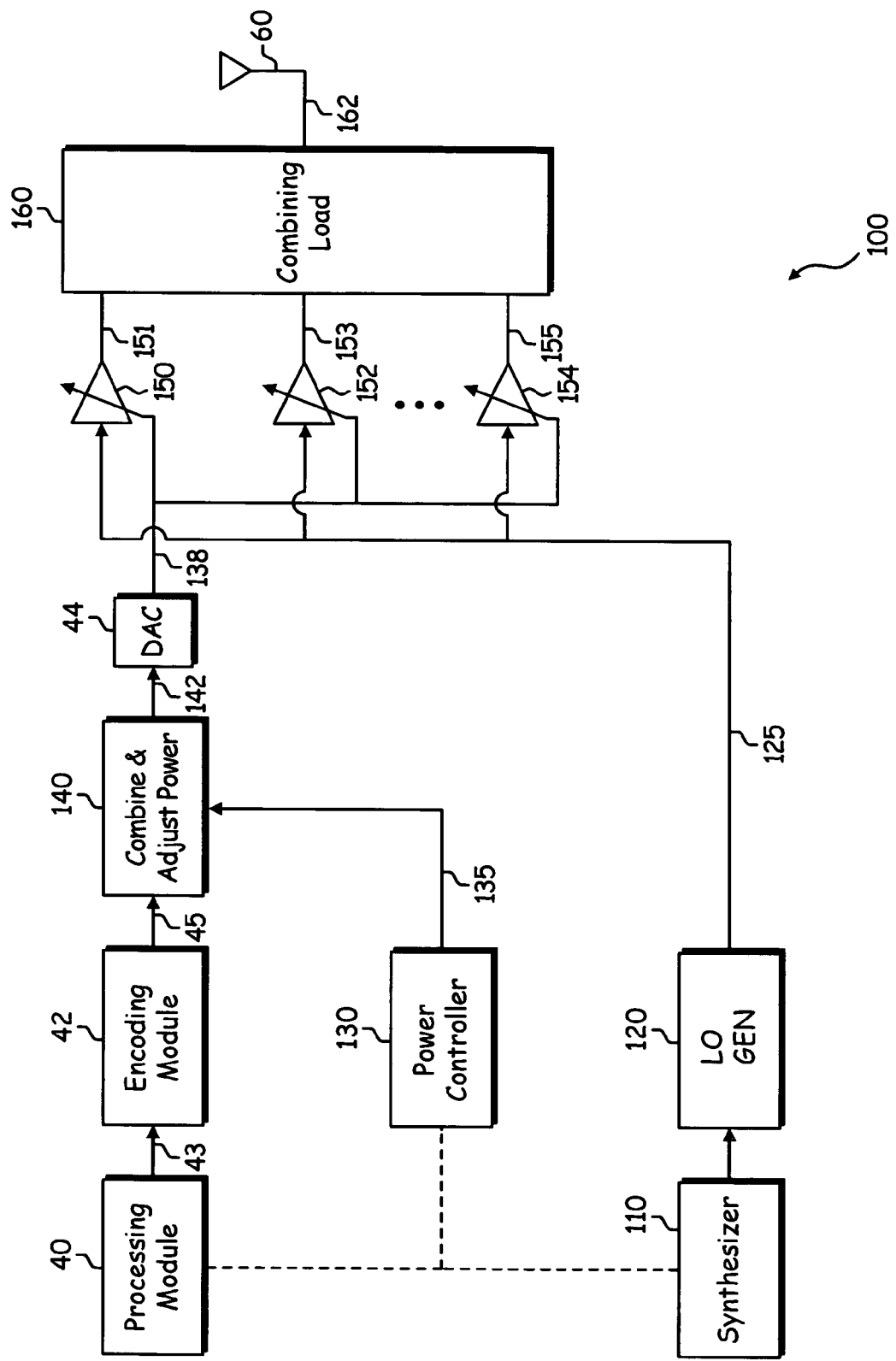

FIGS. 3A-3D are schematic block diagrams of an exemplary transmitter 100 of the RFID reader in accordance with the present invention. Referring first to FIG. 3A, the transmitter 100 includes the processing module 40, the encoding module 42, a combine and adjust power module 140, a power controller 130, a synthesizer 110, a local oscillation generator (LO GEN) 120, power amplifiers 150, 152 and 154 and a combining load 160. The power controller 130, combine and adjust power module 140, synthesizer 110, LO GEN 120, power amplifiers 150, 152 and 154 and combining load 160 form the RF front end 46 of the transmitter 100. The power amplifiers 150, 152 and 154 may be linear or non-linear. In FIG. 3A, the power amplifiers 150, 152 and 154 have a binary matrix control which enables digitally encoded data to be provided directly to the power amplifiers 150, 152 and 154. However, in embodiments in which the power amplifiers 150, 152 and 154 accept analog control input, as shown in FIG. 3B, a DAC 44 is included in the transmit path.

Referring again to FIG. 3A, the processing module 40 provides digital data 43 to the encoding module 42 for encoding of the digital data 43 in accordance with a particular RFID standardized protocol, as discussed above. In embodiments in which the power amplifiers 150, 152 and 154 are non-linear, as shown in FIG. 3A, the encoded data 45 is then provided to the combine and adjust power module 140, where it is combined with an appropriate power variable 135 generated by the power controller 130 to produce a power-optimized signal 138. The power variable 135 controls the individual power produced by each of the power amplifiers 150, 152 and 154. The value of the power variable 135 is determined at least in part by the desired output power of the transmitter, the number of power amplifiers 150, 152 and 154 and the integrated circuit material on which the RFID reader is implemented. For example, if the desired output power of the transmitter 100 is one watt, a ten volt swing is required across one of the power amplifiers 150, 152 or 154. However, in CMOS integrated circuits, each power amplifier 150, 152 and 154 can tolerate a swing of only two volts. Therefore, to produce a total output power of one watt, the power must be divided amongst the power amplifiers 150, 152 and 154 such that no power amplifier 150, 152 and 154 has a swing of more than two volts. Thus, although not specifically shown, at least five power amplifiers 150, 152 and 154 would be required to create the desired one watt output.

As shown in FIG. 3A, the total power is divided evenly between the power amplifiers 150, 152 and 154, such that each power amplifier 150, 152 and 154 receives the same power-optimized signal 138. However, in other embodiments, the total power may be divided in any manner between the power amplifiers 150, 152 and 154, as long as the individual power associated with each power amplifier 150, 152 and 154 remains within operating limits of the integrated circuit material. The outputs 151, 153 and 155 of the power amplifiers 150, 152 and 154 are combined by the combining load 160 to produce the desired total output power of the transmitter 100.

The frequency synthesizer 110, in combination with the LO GEN 120, generates in-phase (I) and quadrature (Q) RF carrier signals 125 (hereinafter termed local oscillation signal) in a desired frequency band. The frequency band of the local oscillation signal 125 depends upon the particular RFID standard. For example, various frequency bands may include 860-960 MHz, 900-931.3 MHz, 13.56 MHz and 2.45 GHz. As shown in FIG. 3A, the local oscillation signal 125 is input to the power amplifiers 150, 152 and 154 for amplification and amplitude modulation using the power-optimized signal 138. The outputs 151, 153 and 155 of the power amplifiers 150, 152 and 154 are combined by the combining load 160 to produce an outbound RF signal 162 for transmission by the antenna 60.

In an exemplary operation involving passive RFID tags, the transmitter 100 first transmits an unmodulated, continuous wave (CW) RF signal to activate and provide power to all passive tags within the range of the antenna 60. To produce the CW signal, the processing module 40 turns on the power controller 130 and synthesizer 110, but does not provide any digital data 43 to the encoding module 42. The processing module 40 further controls the timing of the power controller 130 and synthesizer to ensure that the CW transmission is long enough to enable the tags to receive and decode a subsequent interrogation signal from the transmitter 100 and to generate a response thereto. Thereafter, the transmitter 100 generates and transmits an amplitude-modulated (AM) RF interrogation signal to the tags, requesting data from the RFID tags. After the AM signal has been transmitted for a predetermined length of time, the RF signal is again changed back to a CW signal to provide power to the tags and to allow backscattering of the signal by the tags with the requested data.

Figure 3C:
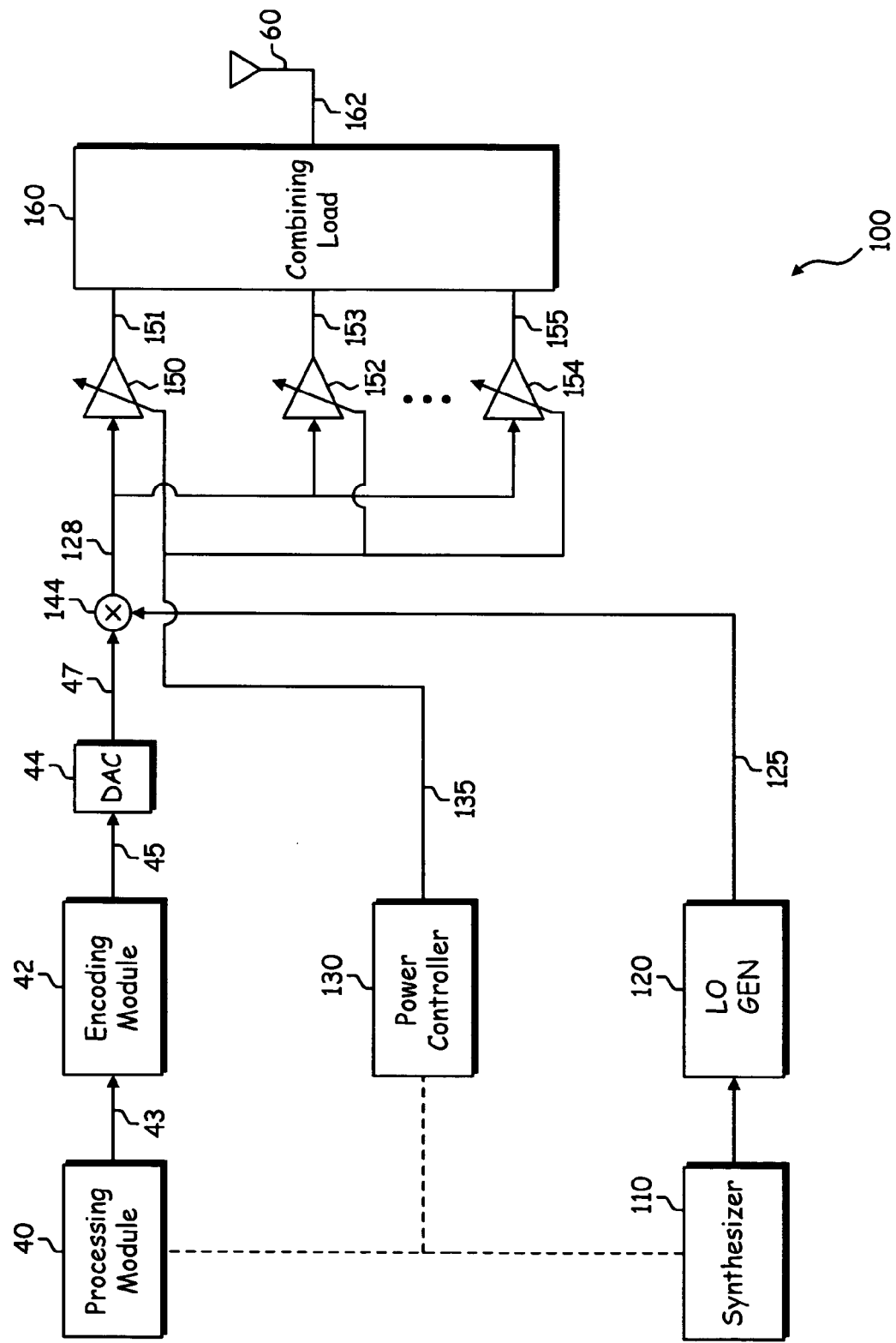
Figure 3D:
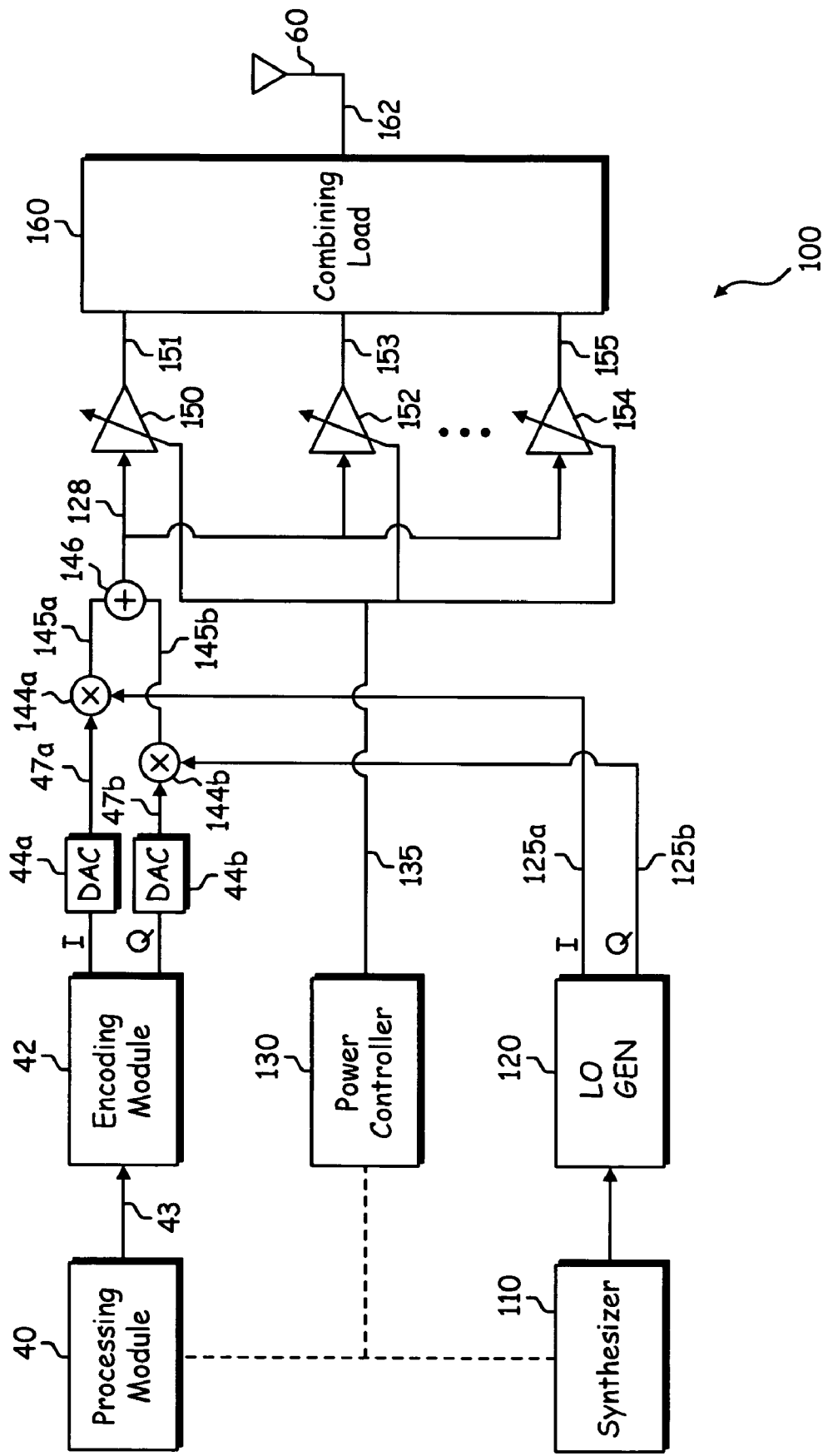

Referring now to FIG. 3C, in embodiments in which the power amplifiers 150, 152 and 154 are linear, the analog signal 47 produced by the DAC 47 may be mixed with the local oscillation signal 125 at mixer 144 to up-convert the analog signal 47, thereby producing a modulated analog signal 128. In this embodiment, the modulated analog signal 128 is input to the power amplifiers 150, 152 and 154 for amplification thereof and the power variable 135 is provided directly to the power amplifiers 150, 152 and 154 to control the output power of each of the power amplifiers 150, 152 and 154. In a further embodiment, as shown in FIG. 3D, an I/Q modulation scheme may be used prior to the power amplifiers 150, 152 and 154. For example, such an I/Q modulation scheme may be used for a single sideband (SSB) transmission from the reader to the tag. Thus, as shown in FIG. 3D, the I and Q components 125a and 125b of the local oscillation signal are input to respective mixers 144a and 144b for mixing with respective I and Q analog signals 47a and 47b produced by respective DACs 44a and 44b to up-convert the analog signals 47a and 47b, thereby producing modulated analog signals 145a and 145b. Modulated analog signals 145a and 145b are combined at summation node 146 to produce combined modulated analog signal 128, which is input to power amplifiers 150, 152 and 154.

Figure 4A:
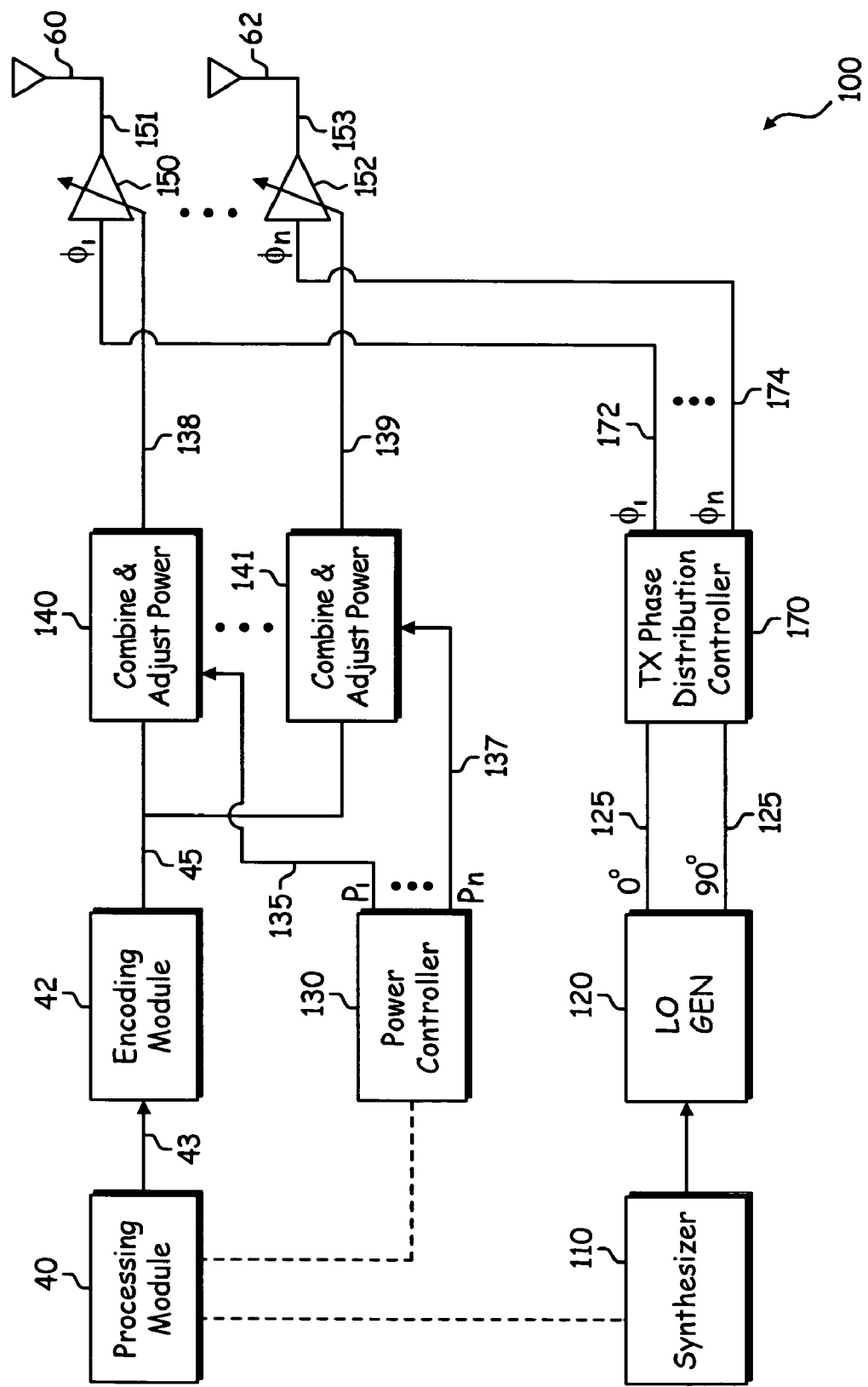
FIGS. 4A and 4B are schematic block diagrams of a multi-antenna transmitter of the RFID reader in accordance with the present invention.
Figure 4B:
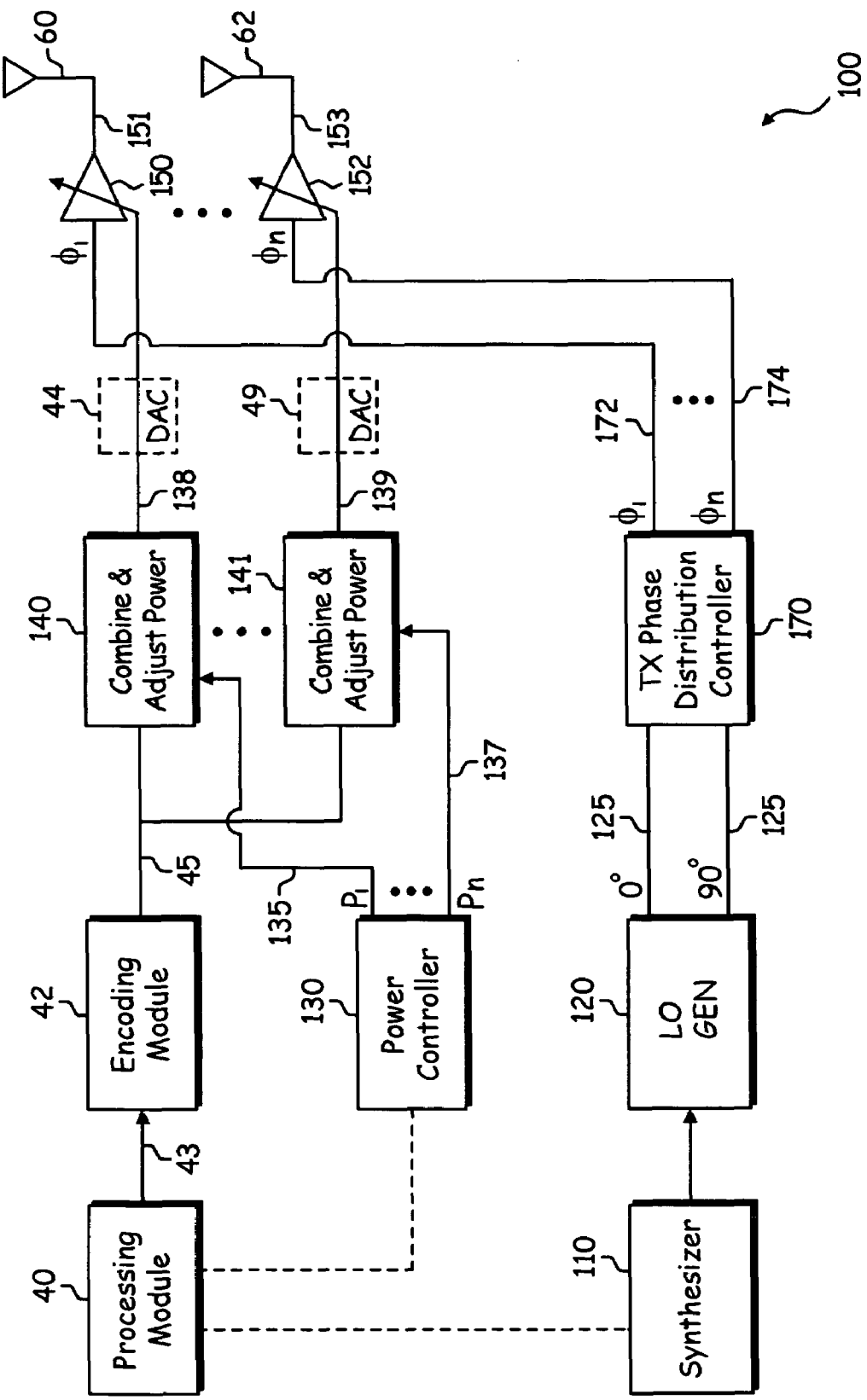

FIGS. 4A and 4B are schematic block diagrams of a multi-antenna transmitter 100 of the RFID reader in accordance with the present invention. In FIGS. 4A and 4B, instead of using a combining load 160 to combine the power before transmission, multiple antennas 60 and 62 are used to combine the power over the air interface. Thus, in FIGS. 4A and 4B, each antenna 60 and 62 is coupled to a respective power amplifier 150 and 152, and each power amplifier 150 and 152 is coupled to a respective combine and adjust power module 140 and 141. In FIG. 4A, the power amplifiers 150, 152 and 154 have a binary matrix control which enables digitally encoded data to be provided directly to the power amplifiers 150, 152 and 154. In FIG. 4B, the power amplifiers 150, 152 and 154 accept analog control input, and therefore, DACs 44 and 49 are included in the transmit path.

Each combine and adjust power module 140 and 141 is operable to combine the digital signal 45 with a respective power variable 135 and 137 generated by the power controller 130 to produce respective power-optimized signals 138 and 139. Each power-optimized signal 138 and 139 (digital or analog) is input to a respective power amplifier 150 and 152 for modulation and amplification of the RF carrier signals 125 generated by the synthesizer 110 and LO GEN 120 to produce respective amplified partial outbound RF signals 151 and 153. Each amplified partial outbound RF signal 151 and 153 is directed to a respective antenna 60 and 62 for transmission and power combining over the air interface. In other embodiments, each power amplifier 150 and 152 is formed of multiple power amplifiers in the configuration shown in FIG. 3.

In one embodiment, the antennas 60 and 62 form an antenna array capable of supporting beamforming and/or polarization (e.g., circular polarization or hopping polarization). For example, as shown in FIGS. 4A and 4B, a phase distribution controller 170 is operably coupled to receive the local oscillation signal 125 from the LO GEN 120. The phase distribution controller 170 controls the individual phases of the antennas 60 and 62 by producing respective phase-controlled RF signals 172 and 174 to the power amplifiers 150 and 152. By controlling the phases of the RF signals output by each antenna 60 and 62, various beamforming and polarization techniques may be used.

Figure 5:
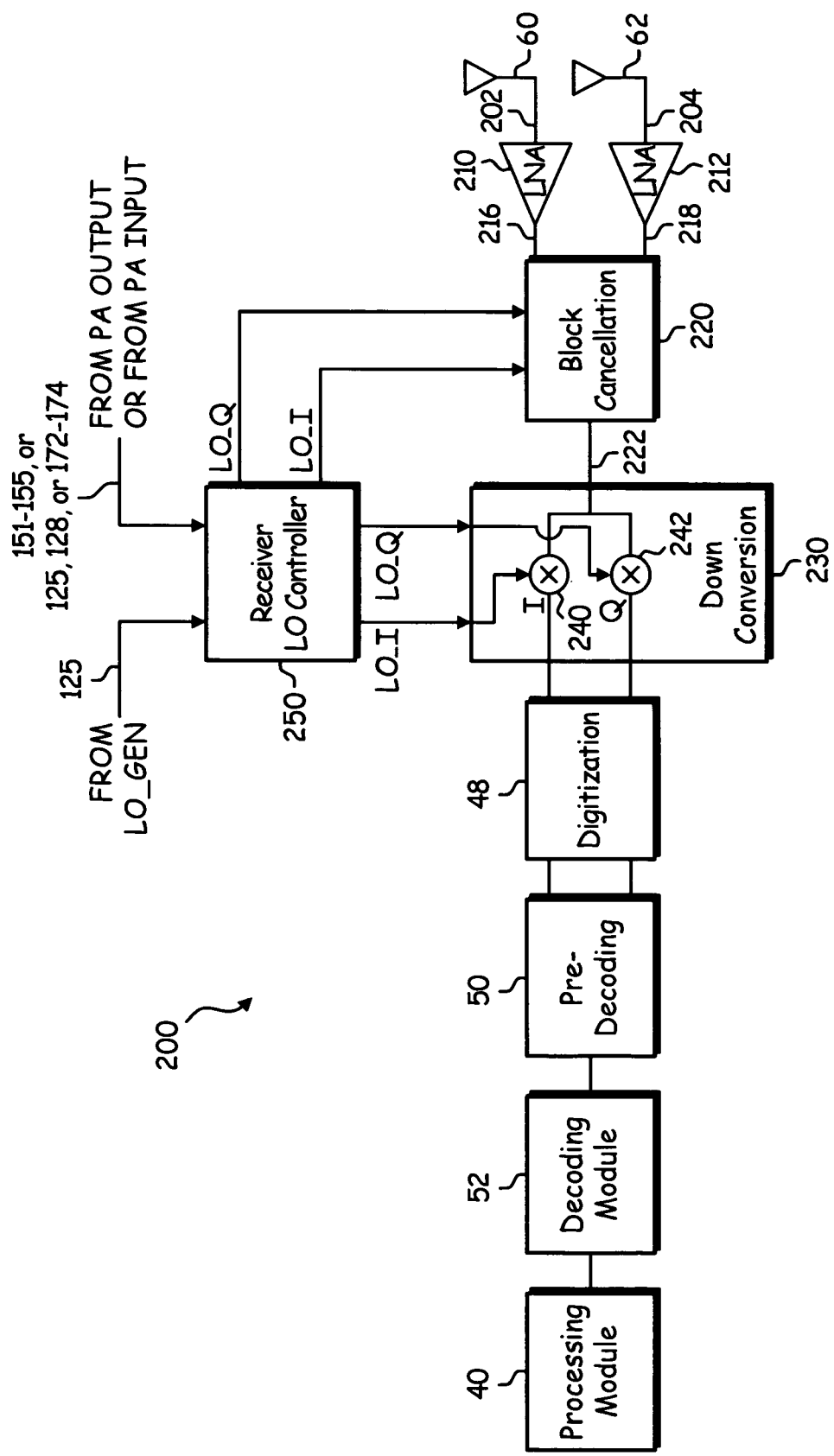
FIG. 5 is a schematic block diagram of a receiver of the RFID reader in accordance with the present invention.

FIG. 5 is a schematic block diagram of a receiver 200 of the RFID reader in accordance with the present invention. The receiver 200 includes low noise amplifiers 210 and 212, a block cancellation module 220, a down-conversion module 230, a receiver local oscillation (LO) controller 250, the digitization module 48, the pre-decoding module 50, the decoding module 52 and the processing module 40. The LNAs 210 and 212, block cancellation module, down-conversion module 230 and controller 250 form the RF front end 46 of the receiver 200. Each low noise amplifier 210 and 212 is operably coupled to receive a respective inbound RF signal 202 and 204 from a respective antenna 60 and 62 and to amplify the inbound RF signals 202 and 204 to produce respective amplified inbound RF signals 216 and 218.

Since the carrier frequency of the inbound RF signal is substantially similar to the carrier frequency of the outbound RF signal, each inbound RF signal 202 and 204 may include not only a modulated inbound RF signal from an RFID tag, but also a blocking signal resulting from leakage of the outbound RF signal from the transmitter 100 into the receiver 200. For example, in embodiments utilizing passive tags, as described above, the RFID reader transmits an unmodulated, continuous wave (CW) signal to power the RFID tag and allow for backscattering of the RF signal. This CW signal may block or otherwise mask the inbound modulated RF signal received from the RFID tag. To identify the desired inbound modulated RF signal from an RFID tag, the amplified inbound RF signals 216 and 218 are input to the block cancellation module 220. The block cancellation module 220 substantially cancels the blocking signal from the amplified inbound RF signals 216 and 218 and substantially passes the modulated RF signal 222 by subtracting the outbound RF signals 151 and 153 produced by the transmitter 100 from the amplified inbound RF signals 216 and 218.

To effectively cancel the blocking signal from the amplified inbound RF signals 216 and 218, referring again to FIGS. 3A-3D and 4A and 4B, the outbound RF signal is tapped from either the output (e.g., 151-155) of the power amplifier 150 or the input (e.g., 125, 128 or 170-172) of the power amplifier 150 and provided to the input of the receiver LO controller 250, as shown in FIG. 5. In embodiments in which the outbound RF signal is taken from the output of the power amplifier 150, such an architecture compensates for any phase noise in the outbound RF signal produced by the power amplifier 150. In embodiments in which multiple power amplifiers drive a single antenna or multiple antennas, and the outputs are tapped, the outputs 151-155 of each of the power amplifiers 150-154 are input to the receiver LO controller 250 and combined for input to the block cancellation module 220. In embodiments in which multiple power amplifiers drive multiple antennas, and the inputs of the power amplifiers are tapped, as shown in FIGS. 4A and 4B, the inputs 172-174 of each of the power amplifiers 150-152 are input to the receiver LO controller 250 and combined for input to the block cancellation module.

The receiver LO controller 250 is further operably coupled to receive the local oscillation signal 125 generated by the LO GEN 120 and to input the local oscillation signal to the down-conversion module 230. The down-conversion module 230 includes a pair of mixers 240 and 242 to mix the inbound modulated RF signal with the local oscillation signal to produce analog near baseband signals. The digitization module 48 converts the analog near baseband signals to digital baseband signals. The digitization module 48 may be an analog-to-digital converter or a limiter. The predecoding module 50 converts the digital baseband signals into an encoded signal in accordance with the particular RFID protocol being utilized. The encoded data is provided to the decoding module 52, which recaptures data therefrom in accordance with the particular encoding scheme of the selected RFID protocol and provides the recovered data to the processing module 40. Although the receiver LO controller 250 is shown receiving both the local oscillation signal 125 from the LO GEN 120 and the input/output of the power amplifier 150, in other embodiments, the receiver LO controller 250 receives only one of these signals (i.e., either the local oscillation signal 125 or the input/output of the power amplifier) and provides this single received signal to both the down-conversion module 230 and the block cancellation module 220.

Figure 6:
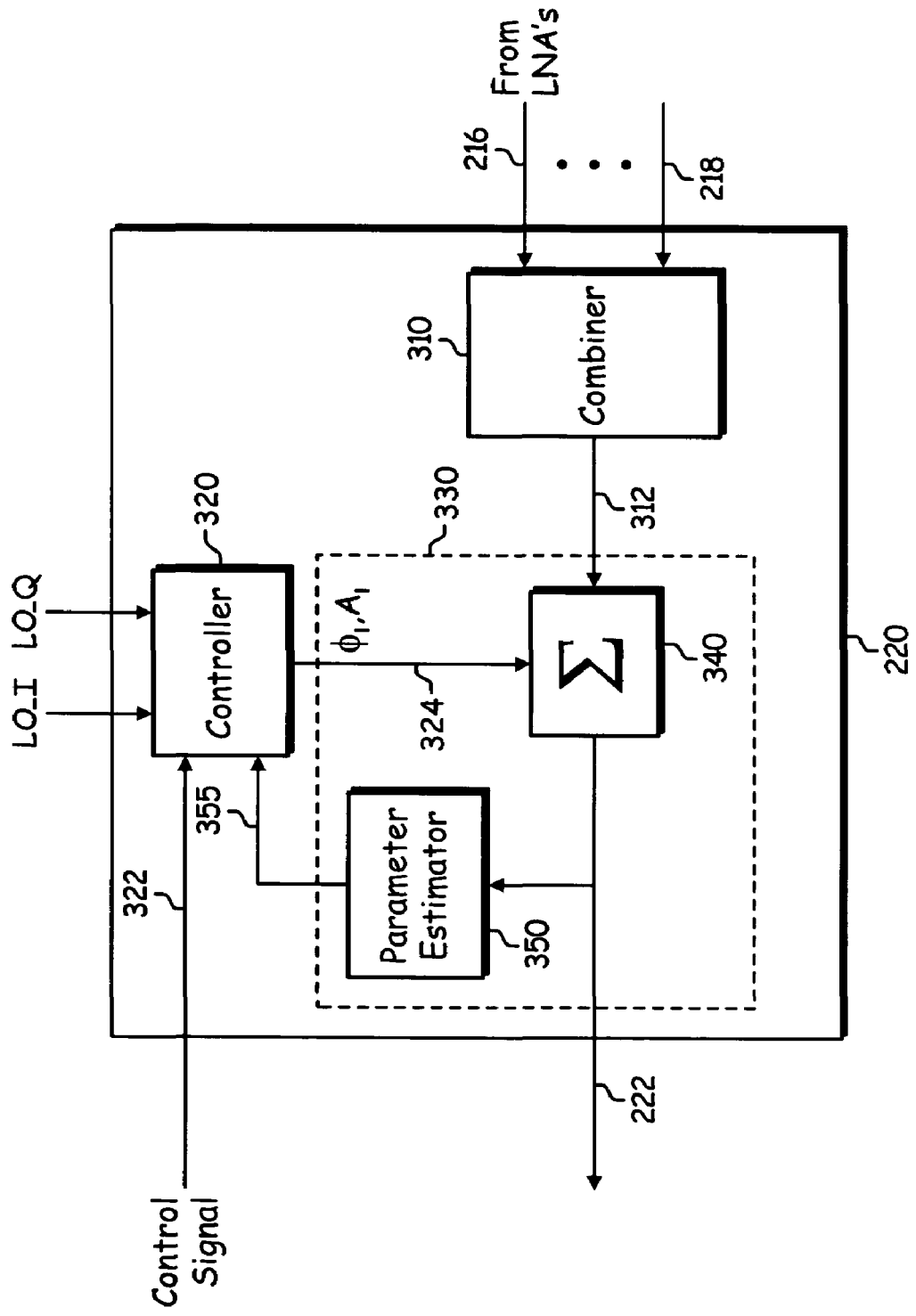
FIG. 6 is a diagram illustrating an example of the functionality of the block cancellation module of FIG. 5.

FIG. 6 is a diagram illustrating an example of the functionality of the block cancellation module 220 of FIG. 5. The block cancellation module 220 includes a combiner 310, a controller 320 and a carrier injection module 330. The combiner 310 is operably coupled to receive the amplified inbound RF signals 216 and 218 from the low noise amplifiers and to combine the amplified inbound RF signals 216 and 218 to produce a combined inbound RF signal 312. The combined inbound RF signal 312 is input to the carrier injection module 330 to substantially cancel any blocking signal from the combined inbound RF signal 312 and substantially pass the inbound modulated RF signal 222 within the combined inbound RF signal 312 that is produced by the RFID tag.

The carrier injection module 330 includes a subtraction module 340 and a parameter estimator module 350 operably coupled in a feedback loop to the controller 320. The subtraction module 340 is operably coupled to receive the combined inbound RF signal 312 from the combiner 310 and a cancellation signal 324 from the controller 320. The subtraction module 340 subtracts the cancellation signal 324 from the combined inbound RF signal 312 to produce the inbound modulated RF signal 222.

The cancellation signal 324 is generated by the controller 320 in response to input from the receiver LO controller, a feedback signal 355 generated by the parameter estimator module 350 and a control signal 322 generated by the processing module. The control signal 322 indicates whether a blocking signal may be present in the combined inbound RF signal, and as such, whether block cancellation needs to be performed. If the control signal 322 requests the controller 320 to perform block cancellation, the controller 320 initially determines the phase and amplitude of the cancellation signal 324 from the outbound RF signal (e.g., signals 151 and 153) generated by the transmitter and input to the controller 320 from the receiver LO controller. Thereafter, the controller 320 continually adjusts the phase and amplitude of the cancellation signal 324 in response to the feedback signal 355. The feedback signal 355 includes phase and/or amplitude estimations performed on the modulated RF signal 222 by the parameter estimation module 350.

Figure 7A:
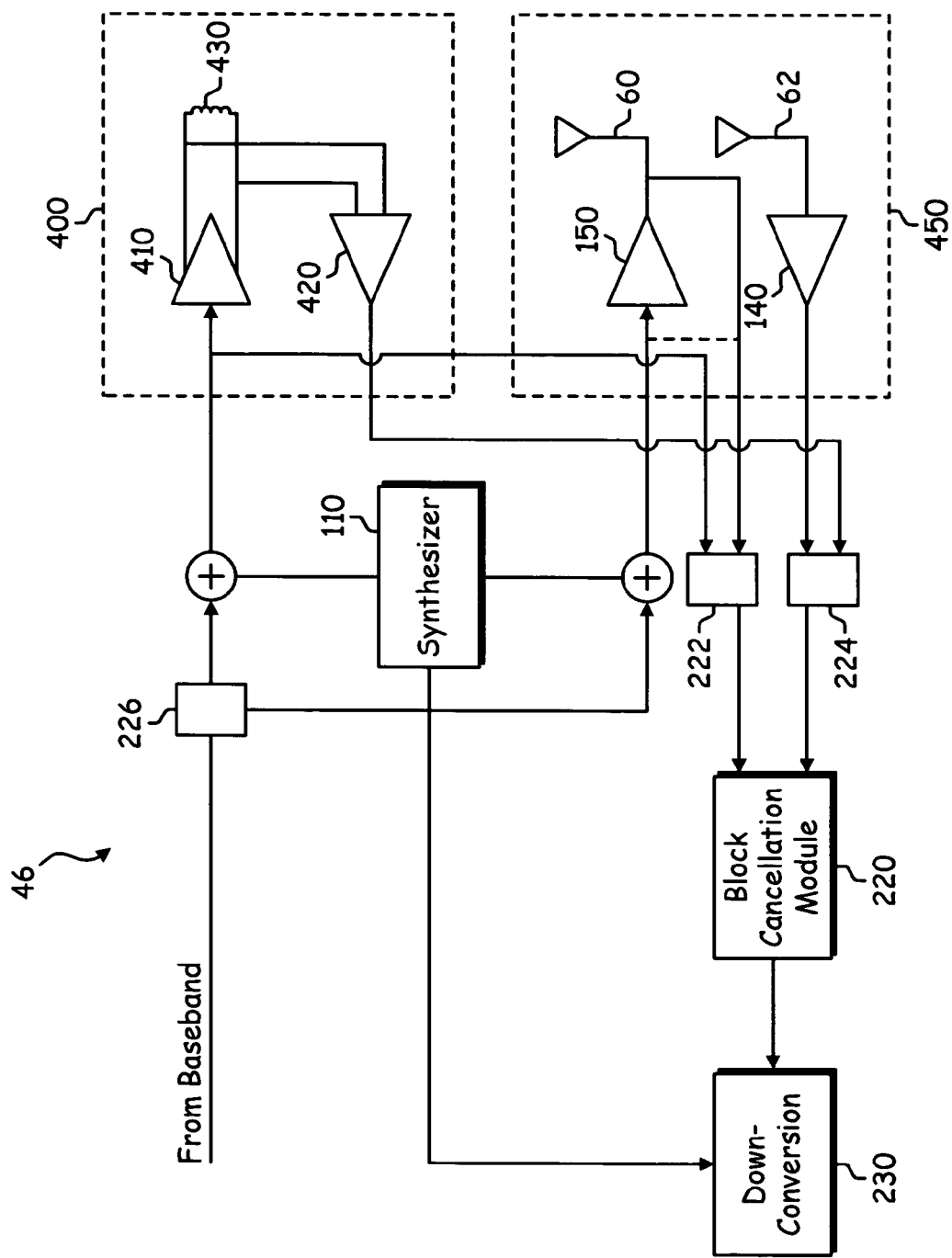
FIGS. 7A and 7B are schematic block diagrams of a dual-mode RF front end of the RFID reader in accordance with the present invention.
Figure 7B:
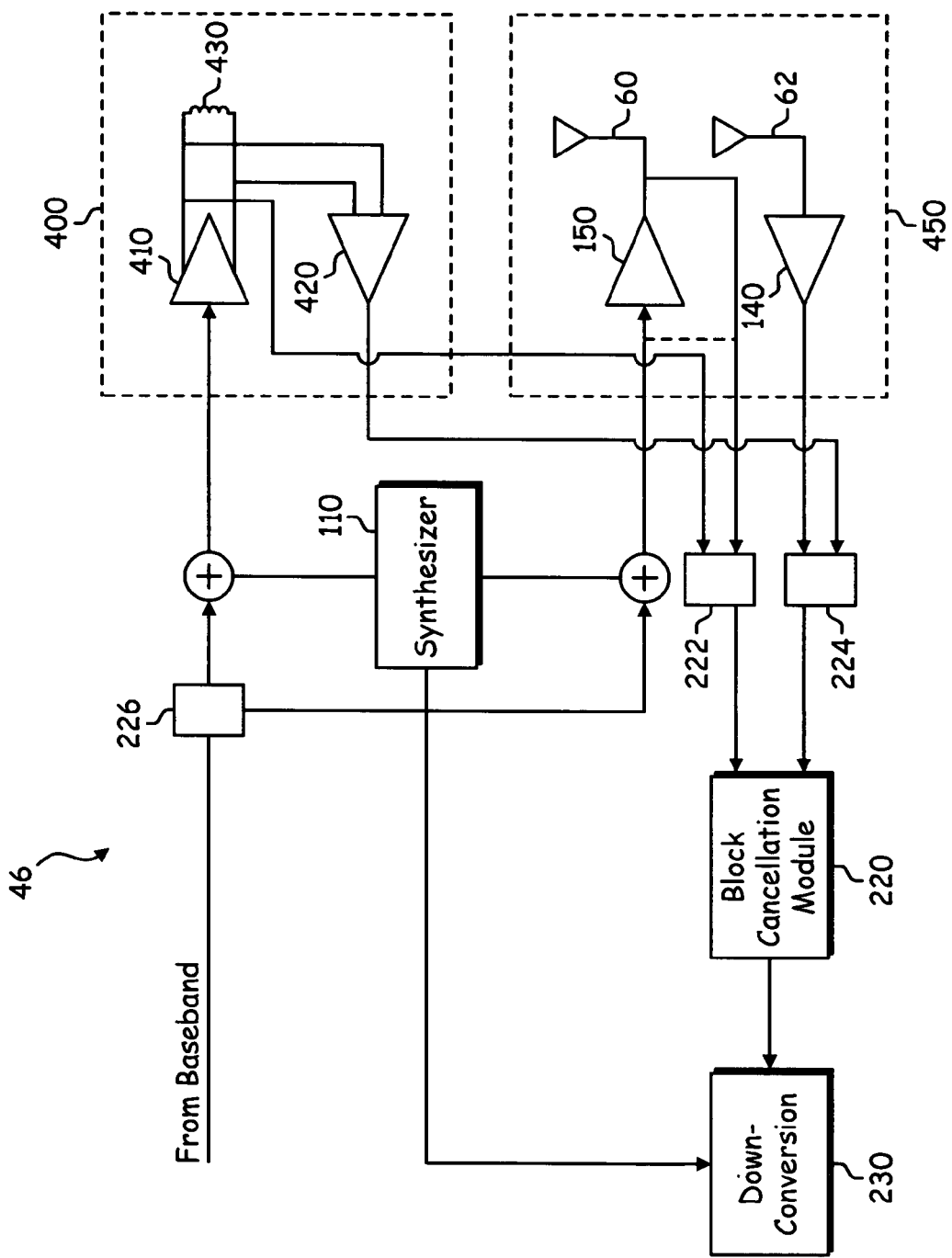

FIGS. 7A and 7B are schematic block diagrams of a dual-mode RF front end 46 of the RFID reader in accordance with the present invention. In FIGS. 7A and 7B, the dual-mode RF front end 46 includes a near-field module 400 for operating in a near-field mode and a far-field module 450 for operating in a far-field mode. The near-field module 400 includes a power amplifier 410, a low noise amplifier 420 and a coil 430. The far-field module 450 includes a power amplifier 150, a low noise amplifier 140 and antennas 60 and 62. Switches 222, 224 and 226 control the operation of the RF front-end 46 in either near-field mode or far-field mode.

In near-field mode, an analog signal from the baseband processor is provided by switch 226 to the near-field module 400. The analog signal is mixed with a local oscillation signal produced by synthesizer 110 and input to power amplifier 410 for amplification thereof. The amplified signal induces the coil 430 to produce a magnetic field which couples to the RFID tag coil through mutual inductance, thereby initiating operation of the tag. The tag generates and transmits an RF response signal to the RFID reader through mutual inductance in the same manner as described above. Typically, the tag utilizes frequency or amplitude modulation of the response signal to encode data stored in the tag into the response signal.

When the tag response signal couples to the reader coil 430, the RF response signal is received at the low noise amplifier 420 and passed to the block cancellation module 220 via switch 224 for further processing. While in near-field mode, the outbound RF signal is tapped from either the input of the power amplifier 410, as shown in FIG. 7A, or the output of the power amplifier 410, as shown in FIG. 7B, and input via switch 222 to the block cancellation module 220 for cancellation of the blocking signal in the RF response signal provided by the LNA 420. The output of the block cancellation module 220 is input to the down-conversion module 230, as described above.

In far-field mode, an analog signal from the baseband processor is provided by switch 226 to the far-field module 450. The analog signal is mixed with a local oscillation signal produced by synthesizer 110 and input to power amplifier 150 for amplification thereof, as shown in FIGS. 3C-3D. In other embodiments, the analog or a corresponding digital signal is used to modulate the local oscillation signal at the power amplifier 150, as shown in FIGS. 3A-3B and 4A-4B. The amplified signal is transmitted by antenna 60 to all tags within the range of antenna 60.

Each tag within range of the antenna 60 generates and transmits an RF response signal to the RFID reader through backscattering, as described above. The RF response signal is received by antenna 62 and passed to the low noise amplifier 420 for amplification thereof. The amplified RF response signal is provided to the block cancellation module 220 via switch 224 for further processing. While in far-field mode, the outbound RF signal is tapped from either the output of the power amplifier 150, as shown by a solid line, or from the input of the power amplifier 150, as shown by a dotted line, and input via switch 222 to the block cancellation module 220 for cancellation of the blocking signal in the RF response signal provided by the LNA 140. The output of the block cancellation module 220 is input to the down-conversion module 230, as described above.

Figure 8:
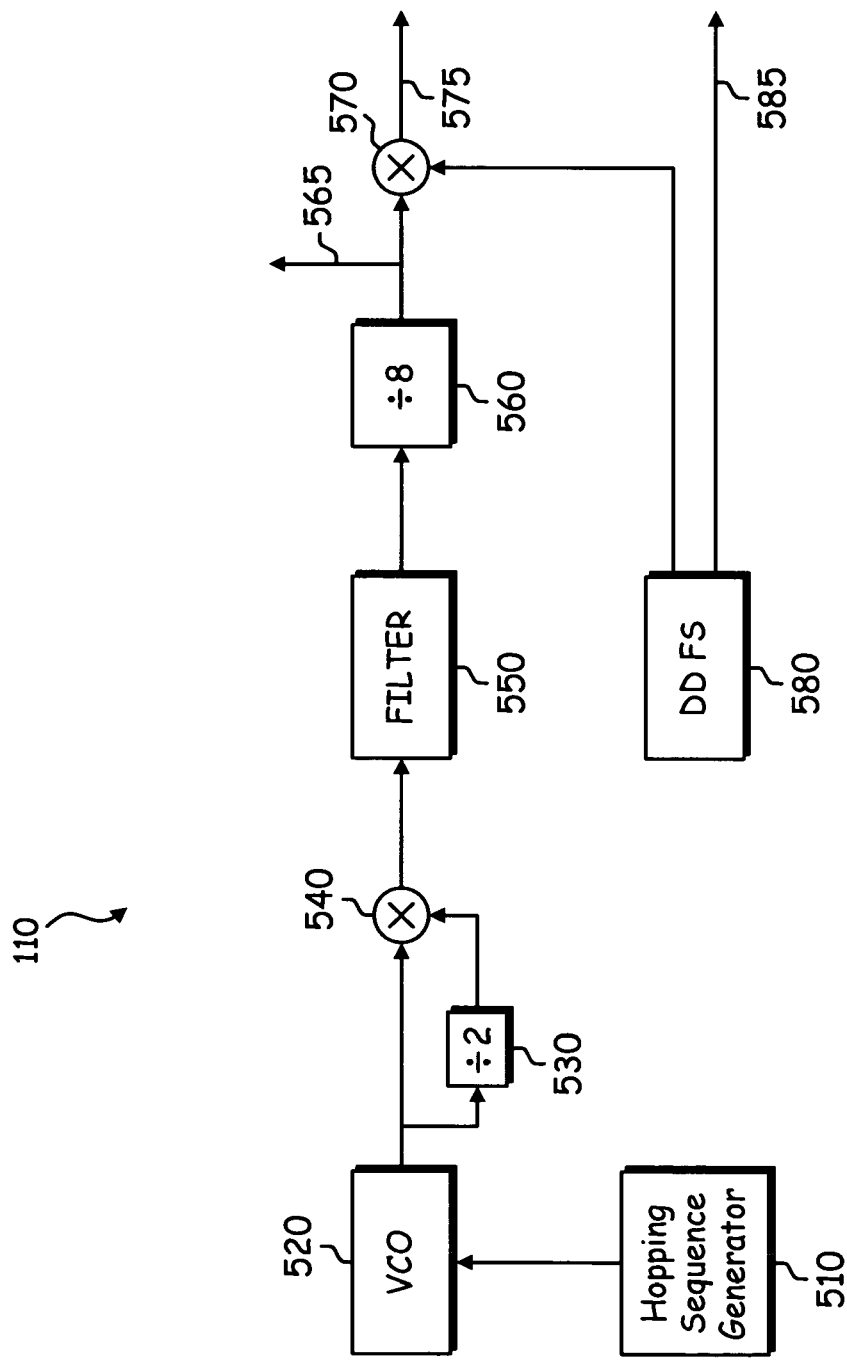
FIG. 8 is a schematic block diagram of a multi-band synthesizer of the RFID reader in accordance with the present invention.

FIG. 8 is a schematic block diagram of a multi-band synthesizer 110 of the RFID reader in accordance with the present invention. The multi-band synthesizer 110 includes a voltage controlled oscillator (VCO) 520, a hopping sequence generator 510, a divide-by-2 block 530, a divide-by-8 block 560, a filter 550, multipliers 540 and 570 and a direct digital frequency synthesizer (DDFS) 580. The hopping sequence generator 510 controls the frequency output of the VCO 520. The frequency produced by the VCO 520 is input to the divide-by-2 block 530 and multiplied by multiplier 540 to the output of the divide-by-2 block 530. The output of the multiplier 540 is input to the filter 550, and the output of the filter 550 is input to the divide-by-8 block 560. The output 565 of the divide-by-8 block 560 is input to the multiplier 570 for multiplication with the output of the DDFS 580.

The divide-by-8 block 560 and DDFS 580 allows the synthesizer 110 to easily generate in-phase (I) and quadrature (Q) carrier signals in three different frequency bands. For example, RF carrier signals 565 in a first frequency band (e.g., 900-931.3 MHz) are produced by taking the output of the divide-by-8 block 560, RF carrier signals 575 in a second frequency band (e.g., 860-960 MHz) are produced by taking the output of the multiplier 570 and RF carrier signals 585 in a third frequency band (e.g., 13.56 MHz) are produced by taking the output of the DDFS.

Figure 9:
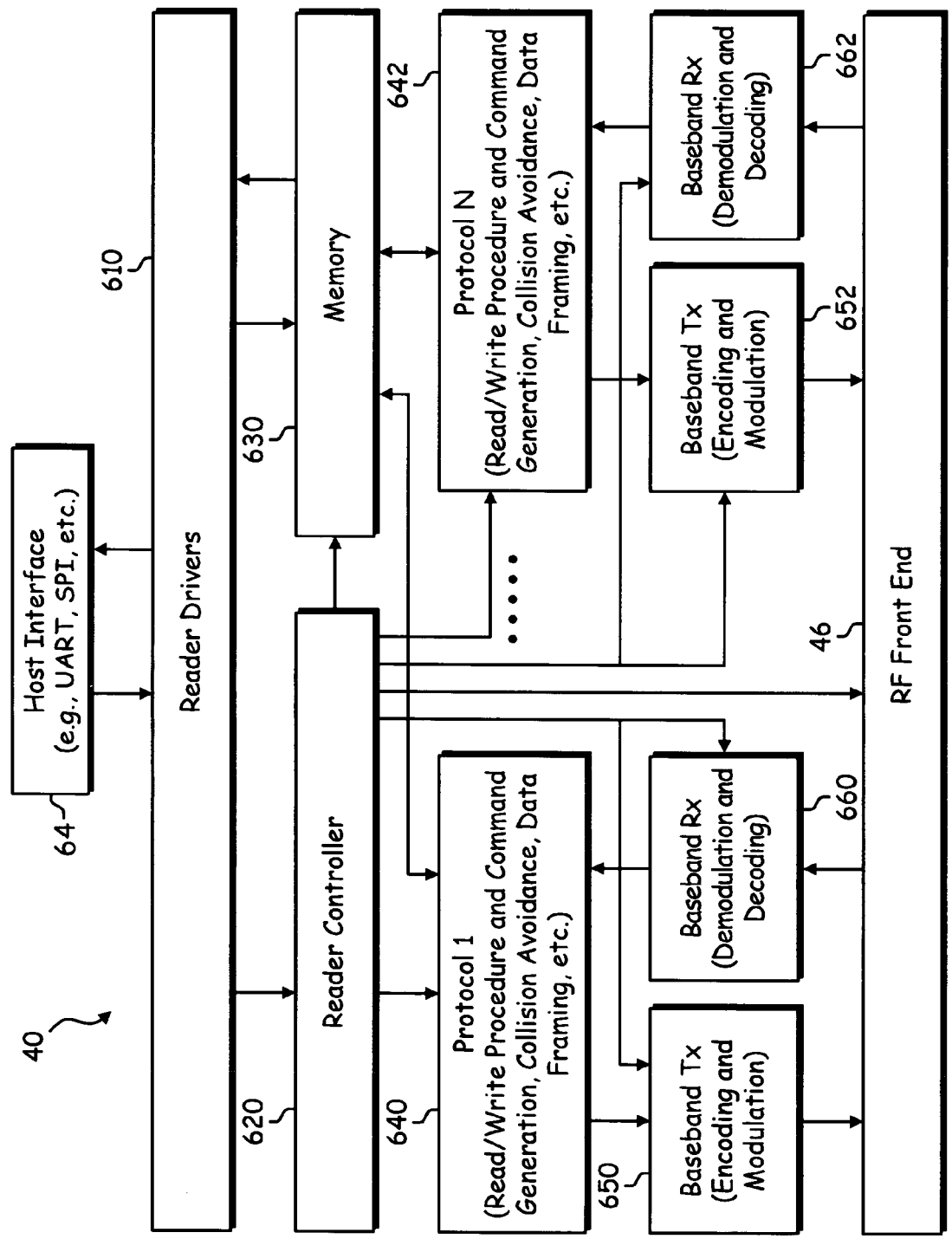
FIG. 9 is a functional diagram of a multi-standard processor firmware of the RFID reader in accordance with the present invention.

FIG. 9 is a functional diagram of a multi-standard processing module 40 of the RFID reader in accordance with the present invention. The processing module 40 includes reader drivers 610, a reader controller 620 and a memory 630. The memory 630 maintains various RFID standardized protocols 640 and 642. The reader controller 620 is operably coupled to the memory 630 to access and retrieve protocol information for executing the protocols 640 and 642. The protocol information includes instructions for the reader controller 620 to program the RF front end 46, the encoding module 42 and the decoding module 52, the latter two being shown in FIG. 2.

In FIG. 9, the encoding module 42 is represented by encoding blocks 650 and 652 and the decoding module 52 is represented by decoding blocks 660 and 662. Encoding block 650 and decoding block 660 represent the encoding module 42 and decoding module 52, respectively, as programmed for a first protocol 640, whereas encoding block 652 and decoding block 662 represent the encoding module 42 and decoding module 52, respectively, as programmed for a second protocol 642.

The reader controller and memory 630 are further operably coupled to the reader drivers 610 to communicate with a host device via the host interface 64. For example, the host device may download protocol information to the memory 630 via the host interface 64 and reader drivers 610. As another example, the host device may instruct the reader controller 620 to search for active and/or passive tags within the coverage area of the reader via the host interface 64 and reader drivers 610. In an exemplary operation, if the reader controller 620 is not provided with a particular protocol for the tag search, the reader controller 620 may initiate a protocol scan to identify the protocols associated with each tag within the coverage area of the reader. From the protocol scan, the reader controller 620 can determine the percentage of tags supporting each protocol for use in scheduling communications between the reader and the tags.

Figure 10:
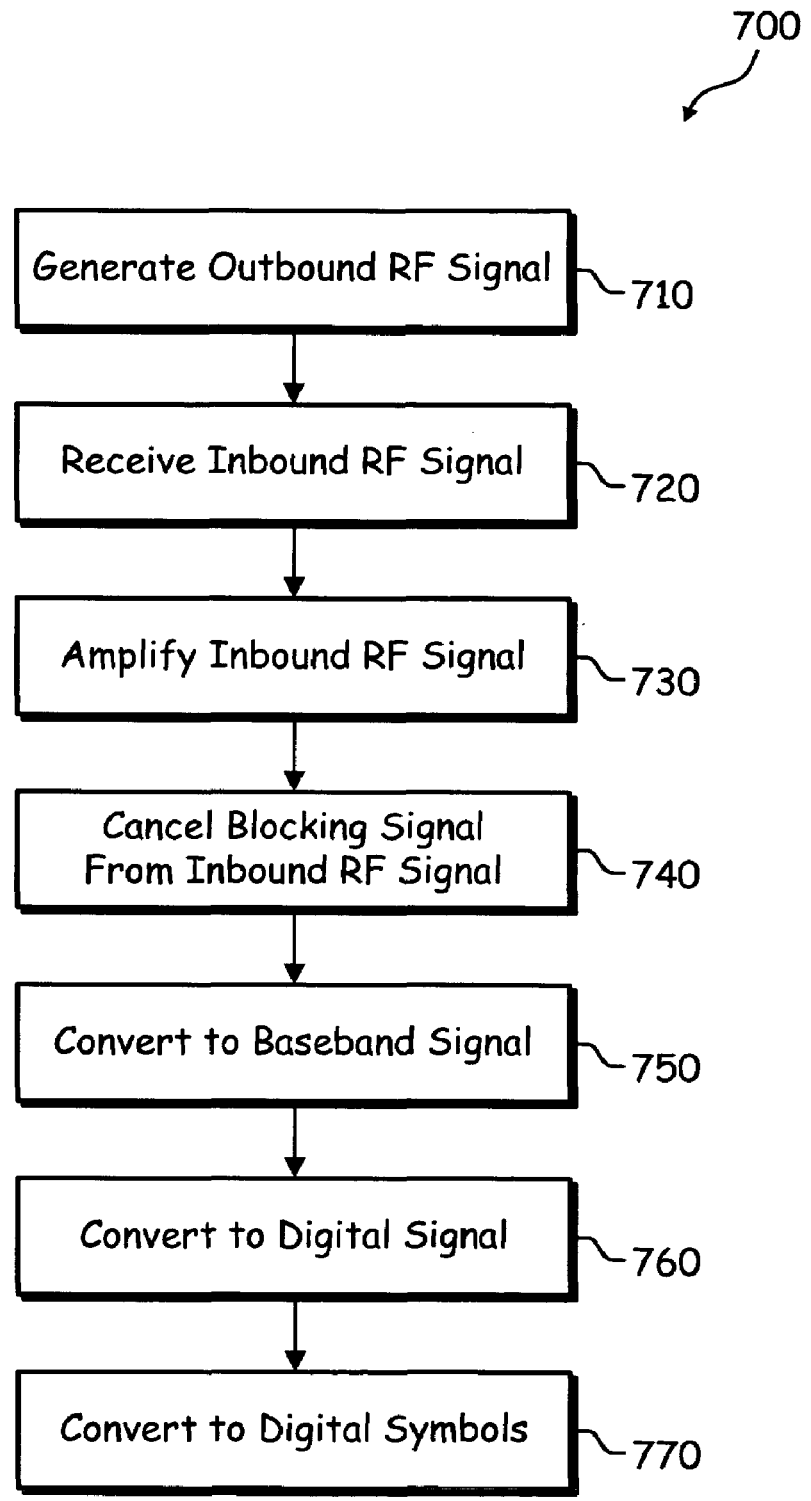
FIG. 10 is a logic diagram of a method for operating the RFID reader in accordance with the present invention.

FIG. 10 is a logic diagram of a method 700 for operating the integrated RFID reader in accordance with the present invention. The method begins at step 710, where an outbound RF signal is generated by the RFID reader. The outbound RF signal is a request for identification data from one or more RFID tags within the coverage area of the RFID reader. The process then proceeds to steps 720 and 730 where the RFID reader receives an inbound RF signal from one or more tags and amplifies the inbound RF signal. The frequency of the inbound RF signal is substantially similar to the frequency of the outbound RF signal. The inbound RF signal includes at least a modulated RF signal produced by one of the tags in response to receipt of the outbound RF signal by the tag. The inbound RF signal may further include a blocking signal corresponding to the outbound RF signal, and resulting from leakage of the outbound RF signal from the RFID transmitter to the RFID receiver.

The process then proceeds to step 740 where the blocking signal is substantially canceled from the inbound RF signal to substantially isolate the modulated RF signal from the RFID tag. For example, in one embodiment, the blocking signal is canceled by subtracting the outbound RF signal produced by the transmitter from the inbound RF signal (amplified or not amplified). Once the blocking signal has been substantially canceled from the inbound RF signal, the process continues at steps 750-770 where the isolated modulated RF signal from the RFID tag is converted to a near baseband signal, the near baseband signal is converted to a digital signal and the digital signal is converted into digital symbols representing the requested identification data of the RFID tag.

As one of ordinary skill in the art will appreciate, the term "substantially," as may be used herein, provides an industry-accepted tolerance to its corresponding term and/or relativity between items. Such an industry-accepted tolerance ranges from less than one percent to twenty percent and corresponds to, but is not limited to, component values, integrated circuit process variations, temperature variations, rise and fall times, and/or thermal noise. Such relativity between items ranges from a difference of a few percent to magnitude differences. As one of ordinary skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "operably coupled".

The preceding discussion has presented an integrated, low-cost RFID reader and method of operation thereof. As one of ordinary skill in the art will appreciate, other embodiments may be derived from the teaching of the present invention without deviating from the scope of the claims.

What is claimed is:

1. A reader for a radio frequency identification system, comprising:
 a transmitter operable to generate an outbound radio frequency (RF) signal;
 a receiver operable to receive an inbound RF signal having a frequency similar to a frequency of said outbound RF signal, said inbound RF signal including a blocking signal corresponding to said outbound RF signal and a modulated RF signal produced responsive to said outbound RF signal, said receiver comprising:
  a low noise amplifier operably coupled to amplify said inbound RF signal to produce an amplified inbound RF signal,
  a block cancellation module operably coupled to receive said outbound RF signal from said transmitter and to substantially cancel said blocking signal from said amplified inbound RF signal using said outbound RF signal and substantially pass said modulated RF signal, wherein said block cancellation module comprises:
   a controller operably coupled to receive said outbound RF signal and to produce a cancellation signal from said outbound RF signal;
   a carrier injection module operably coupled to receive said inbound RF signal and said cancellation signal and to substantially cancel said blocking signal and substantially pass said modulated RF signal using said cancellation signal; and
   a feedback loop operably coupled to control said cancellation signal based on said modulated RF signal;
  a down-conversion module operably coupled to convert said modulated RF signal to a near baseband signal, and
  a digitizing module operably coupled to convert said near baseband signal into a digital baseband signal; and
 a processing module operably coupled to convert said digital baseband signal into inbound digital symbols.

2. The reader of claim 1, wherein said reader is integrated on a single chip.

3. The reader of claim 1, wherein said transmitter comprises a first power amplifier operably coupled to amplify said outbound RF signal, and wherein said block cancellation module is operably coupled to receive said outbound RF signal from an output or an input of said first power amplifier, and further including:
 an antenna operably coupled to receive said outbound RF signal and transmit said outbound RF signal.

4. The reader of claim 3, wherein said transmitter comprises a second power amplifier operably coupled to receive said outbound RF signal and produce an amplified outbound RF signal, and wherein said block cancellation module is operably coupled to receive said outbound RF signal from an input or an output of said second power amplifier, and further including:
 a coil operably coupled to receive said amplified outbound RF signal and transmit said amplified outbound RF signal by generating and modulating the strength of a magnetic field.

5. The reader of claim 1, wherein said outbound RF signal is a modulated RF signal during a first time period and an unmodulated continuous wave RF signal during a second time period.

6. The reader of claim 1, wherein said reader is implemented in a CMOS integrated circuit, and wherein said transmitter further comprises:
 multiple power amplifiers, each operably coupled to receive a respective partial outbound RF signal and to amplify said respective partial outbound RF signals to produce corresponding amplified partial outbound RF signals; and
 a power controller operably coupled to control the power of each of said power amplifiers to within a limit of said CMOS integrated circuit.

7. The reader of claim 6, wherein said transmitter further comprises:

a combining load operably coupled to combine said amplified partial outbound RF signals to produce said outbound RF signal.

8. The reader of claim 6, wherein said transmitter further comprises:
an antenna away including multiple antennas, each operably coupled to receive a respective amplified partial outbound RF signal and to transmit said respective amplified partial outbound RF signal for combination of said amplified partial outbound RF signals over an air interface to produce said outbound RF signal.

9. The reader of claim 8, wherein said transmitter further comprises:
a phase distribution controller operably coupled to said power amplifiers to control a respective phase of each of said amplified partial outbound RF signals.

10. The reader of claim 8, wherein each of said multiple power amplifiers further comprises:
multiple power amplifiers, each operably coupled to receive a respective sub-partial outbound RF signal and to amplify said respective sub-partial outbound RF signals to produce corresponding amplified sub-partial outbound RF signals; and
a combining load operably coupled to combine said amplified sub-partial outbound RF signals to produce said respective amplified partial outbound RF signal.

11. The reader of claim 6, wherein said power amplifiers are non-linear, and wherein said power controller is further operable to modulate the power provided to each of said power amplifiers to produce an amplitude-modulated outbound RF signal.

12. The reader of claim 1, wherein said digitizing module is a limiter or an analog-to-digital converter.

13. The reader of claim 1, further comprising:
a host interface operably coupled to interface said reader with a host device.

14. The reader of claim 1, further comprising:
a frequency synthesizer operable to produce signals at multiple frequencies and operably coupled to said transmitter to generate said outbound RF signal at one of said multiple frequencies.

15. The reader of claim 1, wherein said processing module is programmed with multiple protocols, and wherein said processing module converts said digital baseband signal into said digital symbols using a select one of said protocols.

16. A method for operating an integrated reader for a radio frequency identification system, comprising:
generating an outbound radio frequency (RF) signal;
receiving an inbound RF signal having a frequency similar to a frequency of said outbound RF signal, said inbound RF signal including a blocking signal corresponding to said outbound RF signal and a modulated RF signal produced responsive to said outbound RF signal;
amplifying said inbound RF signal to produce an amplified inbound RF signal;
substantially cancelling said blocking signal from said amplified inbound RF signal by producing a cancellation signal from said outbound RF signal, substantially canceling said blocking signal and substantially passing said modulated RF signal using said cancellation signal and using a feedback loop to control said cancellation signal based on said modulated RF signal;
converting said modulated RF signal to a near baseband signal;
converting said near baseband signal into a digital baseband signal; and
converting said digital baseband signal into inbound digital symbols.

17. The method of claim 16, wherein said outbound RF signal is a modulated RF signal during a first time period and an unmodulated continuous wave RF signal during a second time period.

18. The method of claim 16, wherein said generating further comprises:
receiving partial outbound RF signals;
amplifying each of said respective partial outbound RF signals to produce corresponding amplified partial outbound RF signals; and
combining said amplified partial outbound RF signals to produce said outbound RF signal.

19. The method of claim 18, wherein said generating further comprises:
controlling a respective phase of each of said amplified partial outbound RF signals.

20. The reader of claim 16, wherein said generating further comprises:
modulating the power of each of said amplified partial outbound RF signals to produce an amplitude-modulated outbound RF signal.

\* \* \* \* \*